United States Patent [19]
Aono

[11] 4,435,020
[45] Mar. 6, 1984

[54] DECELERATION DETECTING VALVE RESPONSIVE TO FAILURE IN FRONT BRAKE CIRCUIT

[75] Inventor: Masami Aono, Kanagawa, Japan
[73] Assignee: Tokico Ltd., Kawasaki, Japan
[21] Appl. No.: 379,990
[22] Filed: May 19, 1982

[30] Foreign Application Priority Data
May 20, 1981 [JP] Japan .................. 56-72841[U]

[51] Int. Cl.³ .................................. B60T 8/26
[52] U.S. Cl. ................................. 303/6 C; 188/349; 303/24 A; 303/24 F
[58] Field of Search ............. 303/24 A, 24 F, 24 C, 303/24 R, 6 C, 6 R, 84 A, 84 R; 188/349, 151 A

[56] References Cited
U.S. PATENT DOCUMENTS

| | | | |
|---|---|---|---|
| 3,147,046 | 9/1964 | Stelzer | 303/24 F |
| 3,383,139 | 5/1968 | Chevreux | 303/24 A |
| 3,771,835 | 11/1973 | Yabuta | 303/24 C X |
| 4,077,673 | 3/1978 | Takeshita et al. | 303/24 F |
| 4,085,978 | 4/1978 | Nogami | 303/24 C X |
| 4,360,237 | 11/1982 | Maehara | 303/24 C X |

FOREIGN PATENT DOCUMENTS 2119941 12/1971 Fed. Rep. of Germany .... 303/24 C
2824352 12/1978 Fed. Rep. of Germany ... 303/24 A

*Primary Examiner*—Douglas C. Butler
*Attorney, Agent, or Firm*—Wenderoth, Lind & Ponack

[57] ABSTRACT

A deceleration detecting valve for use in a vehicle hydraulic braking system having a master cylinder, a first circuit connecting the master cylinder with front wheel brakes and a second circuit connecting the master cylinder with rear wheel brakes. The valve has a chamber, and a gravity ball received in the chamber and movable from a first position to a second position in receiving a predetermined deceleration thereby restricting the pressure acting on rear wheel brakes. A slidable member is provided in the chamber with one end thereof receiving the pressure in the first circuit, and ball guiding surfaces are defined on the wall of the chamber and on the slidable member. When the first circuit fails the slidable member retracts in the chamber, and a gap is formed between the ball guiding surface on the slidable member and that of the wall of the chamber thereby impeding the movement of the ball.

2 Claims, 3 Drawing Figures

DECELERATION DETECTING VALVE RESPONSIVE TO FAILURE IN FRONT BRAKE CIRCUIT

BACKGROUND OF THE INVENTION

This invention relates to deceleration detecting valves adapted for use with vehicles such as automobiles or the like.

Deceleration detecting valves are widely used in hydraulic braking systems of vehicles such as automobiles, which systems usually comprise a master cylinder, a first circuit connecting the master cylinder with front wheel brakes, and a second circuit connecting the master cylinder with rear wheel brakes through a deceleration detecting valve. When the deceleration exceeding a predetermined amount occurs during application of the brakes, the deceleration detecting valve is actuated to cut off the supply of pressurized oil to the rear wheel brakes thereby preventing the so-called skidding phenomenon, increasing the braking efficiency and maintaining the directional control of the vehicle.

However, there is a shortcoming in such a hydraulic braking system is that when a failure occurs in the first circuit connecting the master cylinder with the front wheel brakes, and deceleration exceeding the predetermined amount occurs during braking of the vehicle by the rear wheel brakes, the deceleration detecting valve is actuated to cut off the supply of pressurized oil to the rear wheel brakes whereby the vehicle cannot sufficiently be braked. Accordingly, when a failure occurs in the circuit for the front wheel brakes, the rear wheel brakes cannot apply the desired braking force to the vehicle.

SUMMARY OF THE INVENTION

One of the objects of the invention is to overcome the shortcoming aforementioned. The deceleration detecting valve according to the invention relates generally to the type including a casing adapted to be mounted on a vehicle, a ball received in the casing and movable from a first position to a second position when a predetermined amount of deceleration of the vehicle occurs, a first and second oil passages which are connected with each other in the first position of the ball and which are disconnected in the second position of the ball. According to the invention, there are provided a slidable member in the casing, and a ball guiding surface which is defined by surfaces of the casing and the slidable member. When the slidable member is in a first position, the ball guiding surface of the slidable member cooperates with the ball guiding surface of the casing thereby forming a continuous guiding surface, and when the slidable member is in a second position, the ball guiding surface of the slidable member separates from the ball guiding surface of the casing thereby forming therebetween a gap or recess which prevents the ball from moving to the second position.

Preferably, the deceleration detecting valve is incorporated in a vehicle hydraulic braking system comprising a master cylinder, a first circuit connecting the master cylinder with the front wheel brakes, and a second circuit connecting the master cylinder with the rear wheel brakes through the deceleration detecting valve, wherein the slidable member receives the pressure in the first and second circuits on the opposite ends thereof, and a spring is provided to bias the slidable member toward the first position.

BRIEF DESCRIPTION OF THE DRAWINGS

Further objects and advantages of the invention will be clarified from the following description with reference to attached drawings illustrating two preferred embodiments of the invention, in which.

DETAILED DESCRIPTION OF THE PREFERRED EMBODIMENT

Figure 1:
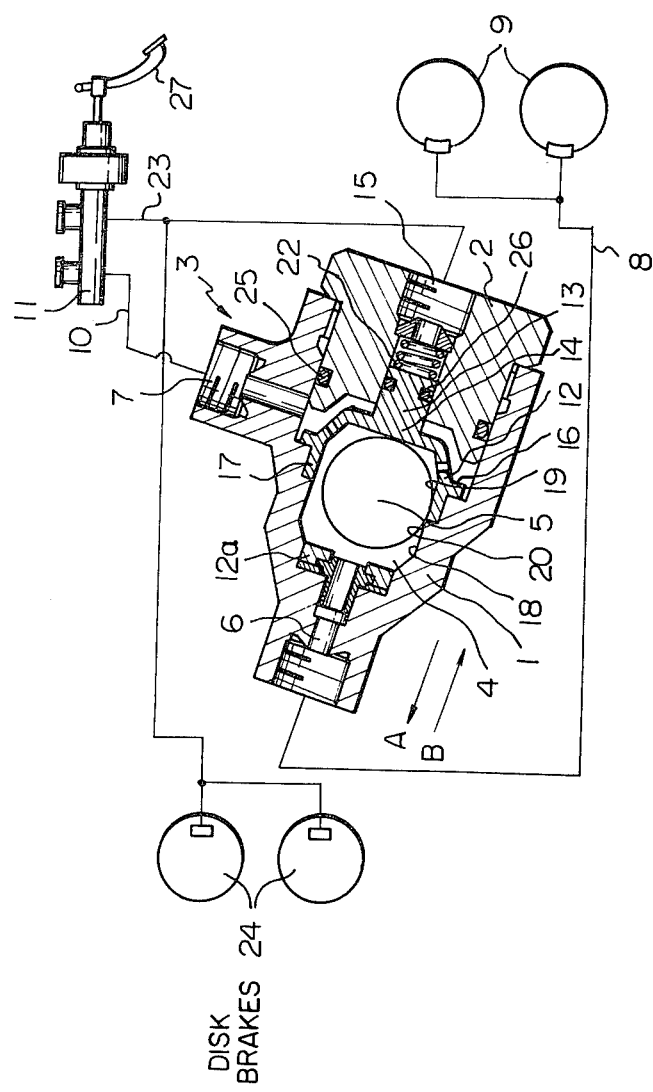
FIG. 1 is a sectional view of a deceleration detecting valve according to the invention with a hydraulic braking system of a vehicle connected to the valve being shown schematically.
Figure 2:
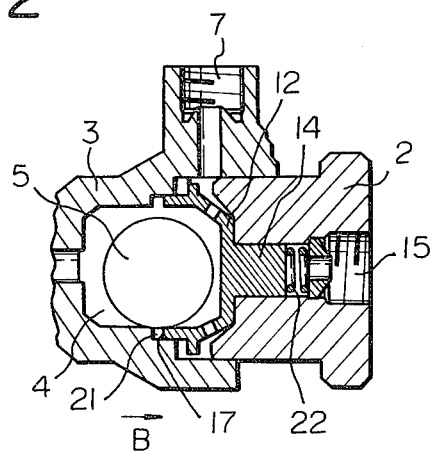
FIG. 2 is a sectional view of the deceleration detecting valve of FIG. 1 with the slidable member thereof being moved to its second position.

Referring to FIGS. 1 and 2, shown at 3 is a casing consisting of a body 1 and a cap 2, and having therein a chamber 4. A steel ball 5 is received in the chamber 4 for detecting the deceleration of a vehicle (not shown) during application of the brakes. The casing 3 has an inlet port 7 and an outlet port 6 communicating normally through the chamber 4. The inlet port 7 is connected to a master cylinder 11 through a piping 10, and the outlet port 6 is connected to rear wheel brakes 9 of a vehicle (not shown) through a piping 8. An annular seal member 12a is provided in the chamber 4 to cooperate with the ball 5 such that when the ball 5 moves leftward the ball 5 engages with the seal member 12a and interrupts the communication between the chamber 4 and the port 6. A slidable member 14 having a generally cup shaped end 12 and a cylindrical end 13 is provided in the casing 3, and the cylindrical end 13 of the slidable member 14 is sealingly and slidably received in a bore 15. A coil spring 22 urges the slidable member 14 in the leftward direction. The leftward movement of the slidable member 14 is restricted by an annular projection 16 and an annular tip end 17 abutting respectively with annular shoulders on the casing 3. A ball guiding surface 19 is formed on the inner surface of the cup-shaped end 12 of the slidable member 14, and a ball guiding surface 20 is formed on the inner wall 18 of the chamber 4. In the normal condition shown in FIG. 1, the annular tip end 17 abuts with a correspondingly shaped shoulder on the casing 3, and the ball guiding surface 19 on the slidable member 14 and the ball guiding surface 20 on the wall 18 forms a continuous guiding surface which permits the ball to smoothly move thereon in the leftward direction or in the direction of arrow A. When the slidable member moves in the direction of arrow B until the cup-shaped end 12 abuts with the inner end of cap 2 as shown in FIG. 2, the annular tip end 17 separates from the shoulder on the casing 3, and a gap or annular recess 21 is formed therebetween to separate the surfaces 19 and 20 sufficiently to prevent the ball from rolling onto the surface 20. The bore 15 is connected to the master cylinder 11 through a piping 23 which also connects the master cylinder 11 with front wheel brakes 24. Shown at 25 and 26 are seal rings.

The operation of the deceleration detecting valve shown in FIGS. 1 and 2 will now be explained. The valve is mounted on the vehicle with the port 6 directed in the forward direction of the vehicle with the ball guiding surfaces 20 and 19 inclining rearwardly and downwardly. The slidable member 14 is urged to the forwardmost position as shown in FIG. 1 by the spring 22 and the ball 5 is in the rearmost or the lowermost position as shown in FIG. 1 due to gravity.

When a brake pedal 27 is depressed, the master cylinder 11 supplies pressurized fluid through the piping 23 to front wheel brakes 24 and also through the piping 10, the chamber 4 and the piping 8 to rear wheel brakes 9. The slidable member 14 and the ball 5 take the positions shown in FIG. 1. When a deceleration exceeding a predetermined amount occurs during actuation of the brakes 9 and 24, the ball 5 rollingly moves along the ball guiding surfaces 19 and 20 in the direction of arrow A direction and intercepts the communication between the chamber 4 and the port 6. The pressurized fluid is not supplied from the master cylinder 11 to the rear wheel brakes 9. Thus, the skidding phenomenon of the rear wheels can be avoided. When the deceleration of the vehicle decreases, the ball 5 moves in the direction of arrow B and separates from the seal member 12a, and the port 6 is communicated with the port 7. When the depressing force applied on the brake pedal 27 is released, the master cylinder 11 returns to its initial condition and the pressurized fluid supplied to the front and rear wheel brakes 24 and 9 is released.

When a failure occurs in the piping 23, and the brake pedal 27 is depressed, the master cylinder 11 cannot supply pressurized fluid to front wheel brakes 24. The pressure in the bore 15 is not elevated the same as that in chamber 4, thereby generating a pressure difference across the slidable member 14 and between the chamber 4 and the bore 15. The slidable member 14 is displaced in the direction of arrow B and takes the position shown in FIG. 2. The annular tip end 17 separates from corresponding shoulder on the casing, thereby forming a gap 21 between the guiding surface 19 on the slidable member and the guiding surface 20 on the casing 3. The gap 21 prevents the movement of the ball 5 in the direction of arrow A, even though the predetermined amount of the deceleration of the vehicle occurs. The front wheel brakes 24 do not act to stop the vehicle, but, rear wheel brakes can fully be actuated and the vehicle can be reliably braked.

Figure 3:
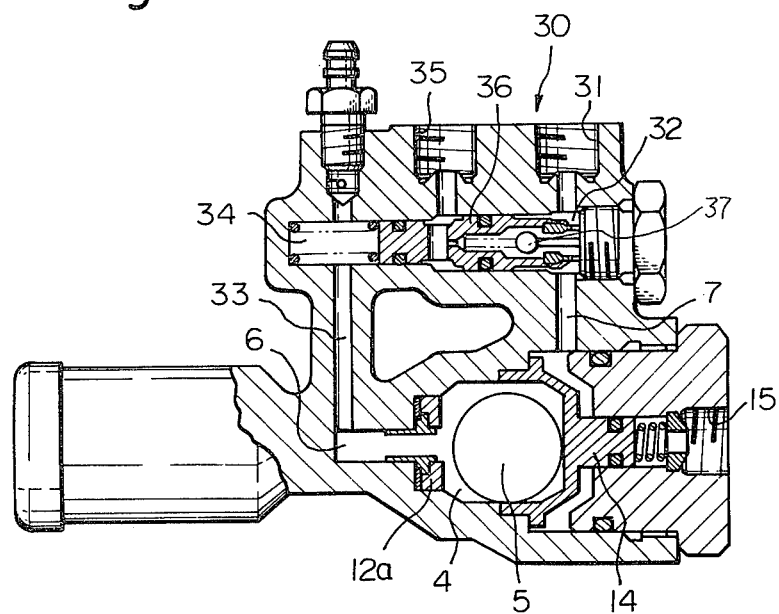
FIG. 3 is a view similar to FIG. 1 but showing a second embodiment of the invention.

FIG. 3 shows a modified form wherein a deceleration detecting valve similar to the first embodiment is combined with a hydraulic pressure control valve 30 known per se. The pressure control valve 30 comprises an inlet 31 adapted to be connected to a master cylinder and an outlet 35 for supplying pressure to the rear wheel brakes. The valve 30 further comprises a stepped piston 36 working in a stepped bore consisting of a large diameter bore 32 and a reduced diameter bore 34, and a ball valve 37 controlling the communication between the inlet 31 and the outlet 35. The deceleration detecting valve according to the invention is connected to the valve 30 such that the inlet 7 is permanently connected with the inlet 31 and the outlet 6 is connected through a passage 33 with the reduced diameter bore 34 which constitutes a pressure chamber. The valve 30 generally controls the pressure supplied to the rear wheel brakes such that the pressure is equal to the pressure supplied to front wheel brakes or that of the master cylinder until the pressure elevates to a predetermined split pressure and, thereafter, the pressure in rear wheel brakes increases at a reduced rate as compared with the pressure in the master cylinder.

Similarly to the first embodiment, when the ball 5 engages with the seal member 12a, the pressure in the outlet 35 is maintained at that condition and does not further increase even though the pressure in the inlet 31 further increases.

It will be understood that the invention is not limited to the above-described embodiments. For example, the slidable member 14 in the embodiments receives equal pressure from the pressure circuit (a first circuit) of the front wheel brakes and a second circuit connected to the rear wheel brakes, and a spring 22 is provided to bias the slidable member 14 to its normal position. However, it is possible to omit the spring 22 by setting the pressure in the bore 15 to be slightly higher than the pressure in the chamber 4, or by forming a restriction on the fluid flow across the cup-shaped end portion 12 of the slidable member 14.

What is claimed is:

1. A deceleration detecting valve for use in a vehicle hydraulic braking system including a master cylinder, a first circuit connecting the master cylinder with front wheel brakes, and a second circuit connecting the master cylinder with rear wheel brakes, said decelerating detecting valve comprising:

a valve body having a chamber with an inlet and an outlet for connecting said chamber in the second circuit;

a decelerating detecting ball received in said chamber, said valve body having a bore therein having one end opening out of said chamber and the other end adapted to be connected to the first circuit for receiving the hydraulic pressure of the first circuit;

a slidable member having a generally cup-shaped end located in and opening toward the interior of said chamber and a cylindrical end slidably and sealingly received in said bore, and said slidable member being slidable between a first position in which said cup-shaped end is remote from said bore and a second position in which said cup-shaped end is adjacent said bore, the wall of said valve body defining said chamber having a ball guiding surface thereon for guiding movement of said ball to a position in said chamber for interrupting communication between said inlet and said outlet, and the inner circumferential surface of said cup-shaped end of said slidable member having a ball guiding surface thereon which, when said cup-shaped end is in said first position, forms a continuation of said ball guiding surface of said chamber and in said second position is spaced from said ball guiding surface of said chamber to leave a gap sufficient to prevent said ball from rolling from said cup-shaped end to said chamber wall guiding surface, and means for normally urging said slidable member toward said first position with a force less than the pressure produced on said slidable member by the hydraulic pressure in said second circuit, said ball normally abutting the bottom of the cup-shaped end of said slidable member and when the deceleration of the vehicle exceeds a predetermined amount, said ball rolls along the ball guiding surfaces to interrupt communication between the inlet and outlet, and when the pressure in the first circuit decreases relative to the pressure in the second circuit, said slidable member retracts to said second position and the gap is formed between the ball guiding surface on said cup-shaped member and the guiding surface on said chamber which prevents the movement of said ball from said guiding surface on said slidable member to the guiding surface on said chamber.

2. A deceleration detecting valve as claimed in claim 1 in which said means for urging said slidable member is a spring engaging said slidable member.

* * * * *